United States Patent
Gaspar et al.

(12) 
(10) Patent No.: US 6,967,967 B1
(45) Date of Patent: Nov. 22, 2005

(54) HOME NETWORK TRANSMISSION DEFERRAL

(75) Inventors: Harand Gaspar, Cupertino, CA (US); Peter K. Chow, San Jose, CA (US); Jenny L. Fischer, Mt. View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 873 days.

(21) Appl. No.: 09/884,783

(22) Filed: Jun. 19, 2001

(51) Int. Cl.[7] ............................................ H04L 12/413
(52) U.S. Cl. ...................................... 370/445; 370/447
(58) Field of Search ................................ 370/445, 910, 370/447

(56) References Cited

U.S. PATENT DOCUMENTS 6,130,894 A * 10/2000 Ojard et al. ................. 370/421

2001/0055311 A1 * 12/2001 Trachewsky et al. ........ 370/445

* cited by examiner

Primary Examiner—Kenneth Vanderpuye
Assistant Examiner—Viet Le
(74) Attorney, Agent, or Firm—Winstead Sechrest & Minick P.C.

(57) ABSTRACT

A method and system for deferring transmission of a data packet over a home network is disclosed, where the home network includes a host media access controller program and a media access controller. The method and system include transmitting a first transmit signal from the host media access controller program to the media access controller (MAC) to transmit a data packet, and asserting a transmit start signal from the MAC in response. The method and system further include receiving a carrier sense signal on the MAC indicating activity on a transmission medium, and delaying assertion of a final transmit signal when it is determined that both the transmit start signal and the carrier sense signal are active, thereby avoiding packet collisions.

12 Claims, 2 Drawing Sheets

HOME NETWORK TRANSMISSION DEFERRAL

FIELD OF THE INVENTION

The present invention relates to home networks, and more particularly to a method and system for deferring transmission of a packet when activity on the transmission medium is detected and means for verifying the same.

BACKGROUND OF THE INVENTION

HomePNA or HPNA is a de facto home networking standard developed by the Home Phoneline Networking Alliance. HPNA allows all the components of a home network to interact over the home's existing telephone wiring without disrupting voice capability. In the same way a LAN operates, home networking processes, manages, transports and stores information, which enables disparate devices in a home network such as telephones, fax machines, desktops, laptops, printers, scanners and Web cameras to connect and integrate over an existing wiring topology.

To create the home network, personal computers may be equipped with a HPNA network and HPNA software. An HPNA network may be implemented as an internal PC network interface card (NICs) that includes telephone jacks on the back for connection to the network. An HPNA network may also be implemented in an external USB adapter that plugs into the USB port on the PC on one end, while the other end connects to the phone line at the wall jack. Additionally, an HPNA network may be implemented as part of the chipset or ACR (Advanced Communications Riser).

FIG. 1 illustrates an embodiment of a home phone line network that complies with the Home Phoneline Networking Alliance (HPNA) specification version 2.0. The network allows multiple computers to communicate through telephone wires typically installed in residential homes. The network includes an application program running on the PC called a host media access controller (MAC) 112, and a control chip 100 for implementing the HPNA 2.0 specification that is included on a network interface card. The control chip 100 includes a Media Independent Interface (MII) 106, a Media Access Controller (MAC) 108, and a Physical Layer (PHY) 110.

The host MAC 112 sends data packets out over the home network, and receives data packets from the network, through the control chip 100. The controller chip 100 communicates with an analog front end (AFE) 104 that processes signals between the chip 100 and the transmission medium, which in this case are the telephone wires of the house that are accessed via a phone jack 102. The AFE 104 converts outgoing digital signals into analog signals, and converts incoming analog signals into digital signals.

When the host MAC 112 transmits a data packet over the telephone wires, it is possible that another device on the network may be in the process of transmitting a data packet. This situation may result in a packet collision, which degrades overall network performance.

Accordingly, the transmission of the data packets from the host MAC 112 needs to be deferred until after the transmission medium is no longer busy. Further, there is a need to verify that the transmission of the data packets are being deferred without monitoring activity on the transmission medium. The present invention addresses such needs.

SUMMARY OF THE INVENTION

The present invention provides a method and system for deferring transmission of a data packet over a home network, where the home network includes a host media access controller program and a media access controller. The method and system include transmitting a first transmit signal from the host media access controller program to the media access controller (MAC) to transmit a data packet, and asserting a transmit start signal from the MAC in response. The method and system further include receiving a carrier sense signal on the MAC indicating activity on a transmission medium, and delaying assertion of a final transmit signal when it is determined that both the transmit start signal and the carrier sense signal are active, thereby avoiding packet collisions.

According to the system and method disclosed herein, the present invention not only avoids packet collisions by deferring transmission of packets when the transmission medium is active, which increases network performance, but also allows for verifying the transmission deferral without monitoring actual signals transmitted over the transmission medium.

DETAILED DESCRIPTION

The present invention relates to deferring transmission of a packet when activity on the transmission medium is detected and means for verifying the same. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
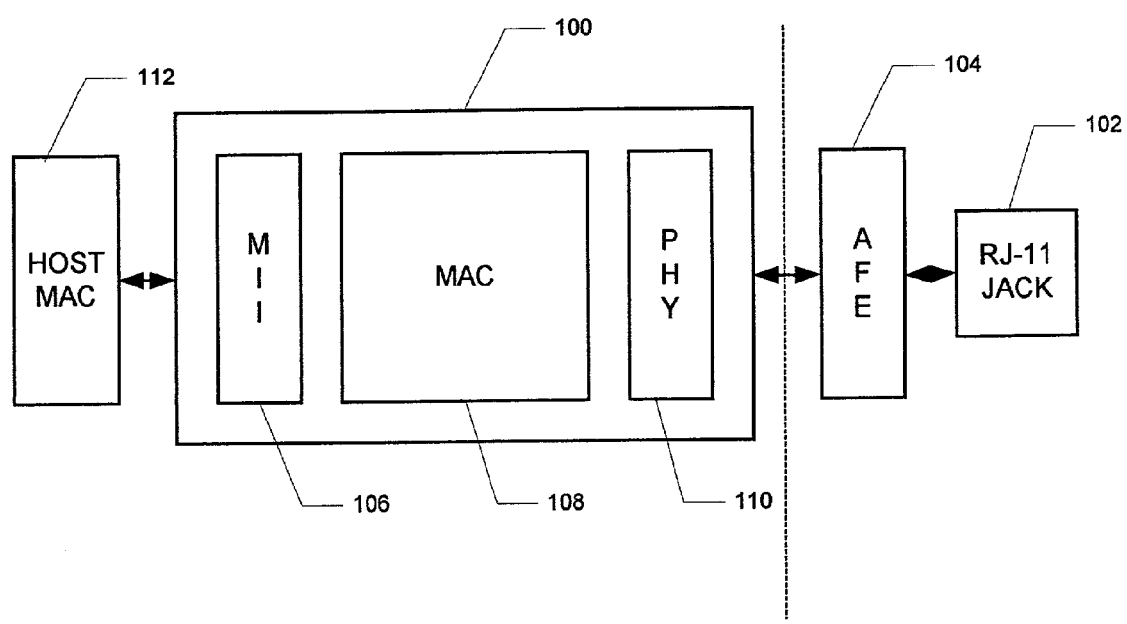
FIG. 1 illustrates an embodiment of a home phone line network that complies with the Home Phoneline Networking Alliance (HPNA) specification version 2.0.
Figure 2:
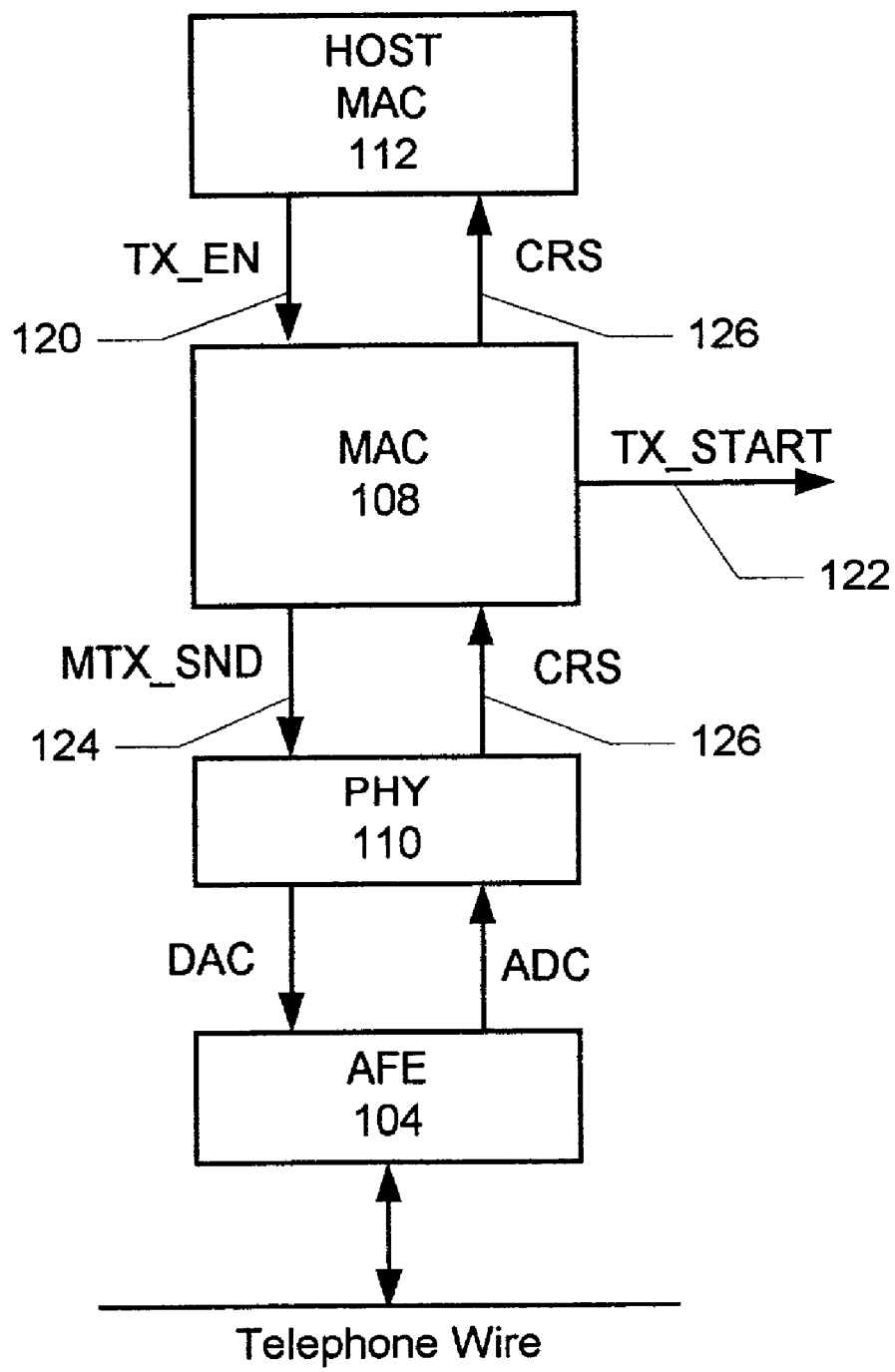
FIG. 2 is a data flow diagram illustrating data packet transmission deferral and detection of the same in a home network in accordance with the preferred embodiment of the present invention.

FIG. 2 is a data flow diagram illustrating data packet transmission deferral and detection of the same in a home network, such as the one illustrated in FIG. 1, in accordance with the preferred embodiment of the present invention. When the host MAC 112 needs to transmit a packet, it sends a transmit enable signal (TX_EN) 120 along with the packet to the MAC 108 through the MII 106 (FIG. 1). After a predetermined time, the MAC 108 asserts a transmit start signal (TX-START) 122, which according to the present invention is used for diagnostic purposes.

After the transmit start signal 122, the MAC 108 typically sends a final transmit signal (MTX_SND) 124 along with the packet to the PHY 110 after a predetermined amount of time to signal to the PHY 110 to begin actual transmission of the packet. However, if the transmission medium is busy because another device is already transmitting, the transmission of the packet will cause a packet collision, which degrades network performance.

Therefore, according to the present invention, prior activity on the transmission medium is indicated by the assertion of a carrier sense signal (CRS) 126. The carrier sense signal 126 is transmitted from the PHY 110 to the MAC 108 and from the MAC 108 to the Host MAC 112. In a preferred embodiment, the carrier sense signal 126 is an OR of two other signals indicating carrier sense for HPNA 1.0 and HPNA 2.0 modes of operation.

When the MAC 108 receives the carrier sense signal 126 after assertion of the transmit start signal 122, assertion of the final transmit signal 124 is deferred, thereby avoiding packet collision.

The Host MAC 112 can verify that the MAC 108 has deferred the final transmit signal (MTX_SND) 124 by evaluating the carrier sense (CRS) 126 and the transmit start signal (TX-START) 122. If both the carrier sense (CRS) 126 and the transmit start signal (TX-START) 122 are active, then it can be determined that the final transmit signal 124 is not asserted. Thus, the present invention provides a diagnostic aid that allows for the testing of transmission deferrals without monitoring the actual signals transmitted between components of the chip 100 and/or from the chip 100 to the transmission medium.

A method and system for deferring transmission of a data packet over a home network and for verifying that that the transmission has actually been deferred has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for deferring transmission of a data packet over a home network that includes a host media access controller program and a media access controller, the method comprising the steps of:
   (a) transmitting a first transmit signal from the host media access controller program to the media access controller (MAC) to transmit a data packet;
   (b) asserting a transmit start signal from the MAC;
   (c) receiving a carrier sense signal on the MAC indicating activity on a transmission medium; and
   (d) delaying assertion of a final transmit signal when both the transmit start signal and the carrier sense signal are active, thereby avoiding packet collisions.

2. The method of claim 1 further including the step of:
   (a) verifying on the host media access controller program that the MAC has deferred the transmit start signal by
      (i) forwarding the carrier sense signal to the host media access controller program,
      (ii) evaluating the carrier sense and the transmit start signal, and
      (iii) determining that the final transmit signal has not been not asserted if both the carrier sense and the transmit start signal are active.

3. The method of claim 2 further including the step of asserting the final transmit signal when the transmit start signal is active and the carrier sense signal is inactive.

4. The method of claim 3 further including the step of providing a telephone wire as the transmission medium.

5. The method of claim 4 further including the step of providing a physical layer between the MAC and the telephone wire and transmitting the carrier sense signal and the final transmit signal between the MAC and the physical layer.

6. A home network, comprising:
   a host media access controller (MAC) running on a computer;
   a chip in communication with the host MAC that allows the computer to communicate through telephone wires, the chip including a media access controller (MAC), and a physical layer (PHY); and
   wherein the host MAC and the MAC function to defer transmission of a data packet over the home network by
      the host MAC transmits a first transmit signal to the MAC to transmit a data packet,
      the MAC asserts a transmit start signal in response,
      if activity is detected on the telephone wire, the PHY transmits a carrier sense signal to the MAC,
      the MAC forwards the carrier sense signal to the host MAC, and
      the MAC delays assertion of a final transmit signal when both the transmit start signal and the carrier sense signal are active, thereby avoiding packet collisions.

7. The system of claim 6 wherein the host MAC verifies that the MAC has deferred the transmit start signal by evaluating the carrier sense and the transmit start signal, and determining that the final transmit signal has not been not asserted if both the carrier sense and the transmit start signal are active.

8. The system of claim 7 wherein the MAC asserts the final transmit signal when the transmit start signal is active and the carrier sense signal is inactive.

9. A method for testing transmission deferral of a data packet over a home network that includes a host media access controller program and a media access controller, the method comprising the steps of:
   (a) transmitting a first transmit signal from the host media access controller program to the media access controller (MAC) to transmit a data packet;
   (b) asserting a transmit start signal from the MAC;
   (c) receiving a carrier sense signal on the MAC indicating activity on a transmission medium, and forwarding the carrier sense signal to the host media access controller program;
   (d) delaying assertion of a final transmit signal when both the transmit start signal and the carrier sense signal are active; and
   (e) verifying on the host media access controller program that the MAC has deferred the transmit start signal by
      (i) evaluating the carrier sense and the transmit start signal, and
      (ii) determining that the final transmit signal has not been asserted if both the carrier sense and the transmit start signal are active, thereby avoiding packet collisions.

10. The method of claim 9 further including the step of asserting the final transmit signal when the transmit start signal is active and the carrier sense signal is inactive.

11. The method of claim 10 further including the step of providing a telephone wire as the transmission medium.

12. The method of claim 11 further including the step of providing a physical layer between the MAC and the telephone wire and transmitting the carrier sense signal and the final transmit signal between the MAC and the physical layer.

* * * * *

UNITED STATES PATENT AND TRADEMARK OFFICE
CERTIFICATE OF CORRECTION

PATENT NO. : 6,967,967 B1
DATED : November 22, 2005
INVENTOR(S) : Harand Gaspar, Peter K. Chow and Jenny L. Fischer It is certified that error appears in the above-identified patent and that said Letters Patent is hereby corrected as shown below:

<u>Column 3,</u>
Lines 4-9, remove the indentation of these lines.

Signed and Sealed this

Twenty-third Day of May, 2006

JON W. DUDAS
*Director of the United States Patent and Trademark Office*